(12) United States Patent
Mastley et al.

(10) Patent No.: US 6,374,878 B1
(45) Date of Patent: Apr. 23, 2002

(54) PORTABLE FIXTURE FOR WOODWORKING TOOLS

(76) Inventors: Patrick J. Mastley, 9630 2013th Ave. N., Elk River; Ronald K. Westby, 7059 166th Ave. N., Ramsey, both of MN (US) 55303

(*) Notice: Subject to any disclaimer, the term of this patent is extended or adjusted under 35 U.S.C. 154(b) by 0 days.

(21) Appl. No.: 09/648,137

(22) Filed: Aug. 25, 2000

(51) Int. Cl.$^7$ ................................................ B27C 9/00
(52) U.S. Cl. ................ 144/48.6; 144/134.1; 144/135.2; 144/136.1; 144/137; 144/154.5; 144/371; 409/182
(58) Field of Search .................. 409/182, 175, 409/178, 181, 185, 183, 206; 144/134.1, 134.5, 136.95, 135.2, 137, 136.1, 371, 154.5, 48.6

(56) References Cited

U.S. PATENT DOCUMENTS

| | | | |
|---|---|---|---|
| 4,098,170 A | 7/1978 | Russell | |
| 4,102,374 A | 7/1978 | Klein | |
| 4,338,052 A | 7/1982 | Lockett | 409/206 |
| 4,458,736 A | 7/1984 | Trevor | 144/144.1 |
| 4,538,654 A | 9/1985 | Nickoloff | 144/48.6 |
| 4,538,946 A | 9/1985 | Bloch | 409/179 |
| 4,561,478 A | 12/1985 | Fields | 144/144.1 |
| 4,696,331 A | 9/1987 | Irland | 144/136.95 |
| 4,729,698 A | * 3/1988 | Haddon | 144/48.6 |
| 4,770,216 A | 9/1988 | Ruscak | 144/144.1 |
| 4,871,002 A | 10/1989 | Turner | 144/144.1 |
| 4,886,467 A | 12/1989 | Peveto | 439/192 |
| 4,991,637 A | 2/1991 | Butler | 144/372 |
| 5,267,818 A | 12/1993 | Marantette | 409/132 |
| 5,325,899 A | 7/1994 | Kochling | 144/144.1 |
| 5,492,160 A | 2/1996 | McCracken | 144/367 |
| 5,772,368 A | * 6/1998 | Posh | 144/154.5 |
| 5,853,036 A | * 12/1998 | Welch | 144/137 |
| 5,873,686 A | * 2/1999 | Elmore | 409/182 |
| 6,003,409 A | 12/1999 | Lamsfuss et al. | 74/825 |

* cited by examiner

Primary Examiner—W. Donald Bray
(74) Attorney, Agent, or Firm—Nikolai & Mersereau, P.A.

(57) ABSTRACT

A multipurpose, portable fixture for hand held woodworking power tools is described. The portable fixture of the present invention allows for controlled multidirectional operations with the woodworking tools on a workpiece. The woodworking tool may be tipped, rotated and linearly displace through multiple planes, thereby allowing complex operations on the workpiece. A variety of woodworking tools may be mounted to the portable fixture of the present invention to perform a variety of operations on the workpiece.

32 Claims, 8 Drawing Sheets

PORTABLE FIXTURE FOR WOODWORKING TOOLS

This invention relates generally to woodworking tools and more particularly relates to a multipurpose portable fixture for hand held woodworking power tools. The portable fixture of the present invention allows for controlled multidirectional operations with the woodworking tools on a workpiece. For example, the portable future allows controlled movement of the woodworking tool through at least four planes. Without limitation, the portable fixture allows controlled linear movement, tipping, turning, arcing, and plunging of the woodworking tool. Those skilled in the art will appreciate that a variety of woodworking tools may be mounted to the portable fixture of the present invention to perform a variety of operations on the workpiece.

BACKGROUND OF THE INVENTION

Over the years, handheld woodworking tools have been utilized to perform various operations on a workpiece. For example, routers and router bits have been utilized to cut various shapes along the edges and across a workpiece. Oftentimes, the workpiece is held stationary and a router is moved around the perimeter edge of the work piece, cutting the shape into the edge of the workpiece. The router may include a plunger that allows the user to control the depth of the shape cut in the edge of the workpiece. Alternatively, the router has been mounted to a table and the user moves the workpiece past the router bit, cutting the shape of the router bit into the workpiece. In the past, multidirectional use of the router on the workpiece has been limited.

For example, U.S. Pat. No. 4,561,478 issued to Fields describes a router jointing fixture capable of moving the head of the router linearly in the x and y axis of the same horizontal plane. The workpiece may be tipped relative to the horizontal plane. Fields does not describe controlled rotation or linear movement for multidirectional operations on a workpiece. U.S. Pat. No. 4,098,170 issued to Russell and U.S. Pat. No. 4,458,736 issued to Trevor describe engraving and routing machines that allow for directional movement in a predetermined horizontal plane. However, these references do not show or describe a fixture suitable for mounting a variety of handheld power tools, wherein the handheld tool may be manipulated in multiple directions through multiple planes in a controlled manner. The present invention meets these and other needs that should become apparent to those skilled in the art.

SUMMARY OF THE INVENTION

It is accordingly a purpose of the present invention to provide a multipurpose portable fixture adapted for securing a power tool thereto, allowing multidirectional operations on a workpiece. The portable fixture of the present invention generally includes a base, an extension member extending outwardly from the base, and a support frame that supports the hand held power tool. The support frame is releasably attached to the extension member, wherein the support frame may be rotated about an axis of the extension member. Further, the extension member includes a slot extending therethrough, thereby allowing for linear displacement of the support frame along the slot. The support frame includes a drive system that may control linear displacement of the support frame relative to the base and extension member.

The base of the portable fixture includes an alignment member extending from the bottom surface of the base. Without limitation, the alignment member may be adapted for engagement with the longitudinal slot of a table saw that runs parallel with the saw blade. The base may further include drive systems attached to the base for controlled linear displacement of the base through the x and y axis and rotational displacement through the same. The advantages of the present invention will become readily apparent to those skilled in the art from a review of the following detailed description of the preferred embodiment especially when considered in conjunction with the claims and accompanying drawings in which like numerals in the several views refer to corresponding parts.

DETAILED DESCRIPTION

The present invention represents broadly applicable improvements to fixtures for woodworking power tools. The embodiments detailed herein are intended to be taken as representative or exemplary of those in which the improvements of the invention may be incorporated and are not intended to be limiting. For purposes of discussion, and without any limitation intended, the portable fixture 10 of the present invention will be described in conjunction with a router 12 attached thereto. Those skilled in the art will appreciate that a variety of other hand held woodworking power tools may be attached to portable fixture 10, including, without limitation drills, grinders, engravers, sanders, and hand held saws.

Figure 1:
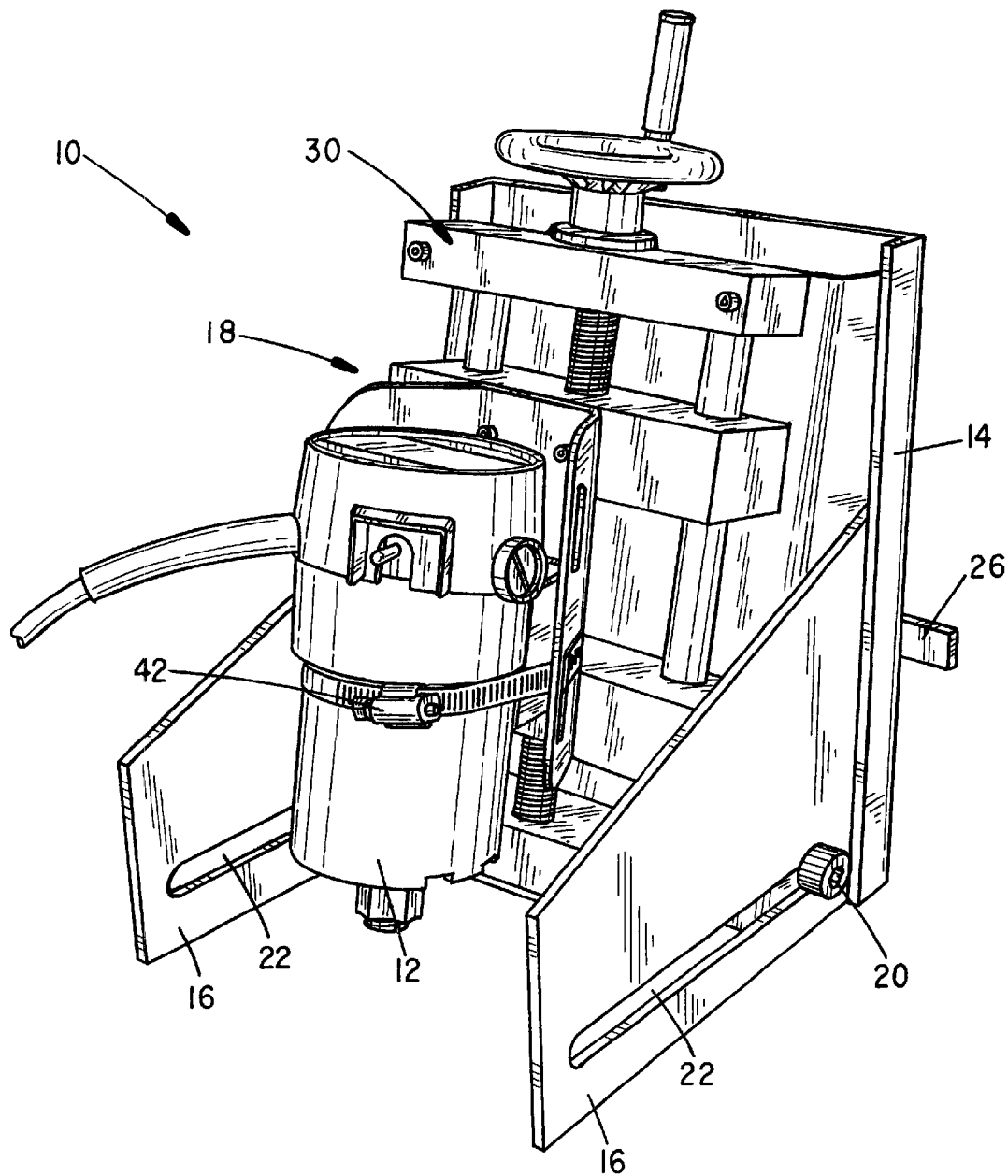
FIG. 1 is a perspective view of the portable fixture of the present invention having a router attached thereto.
Figure 2:
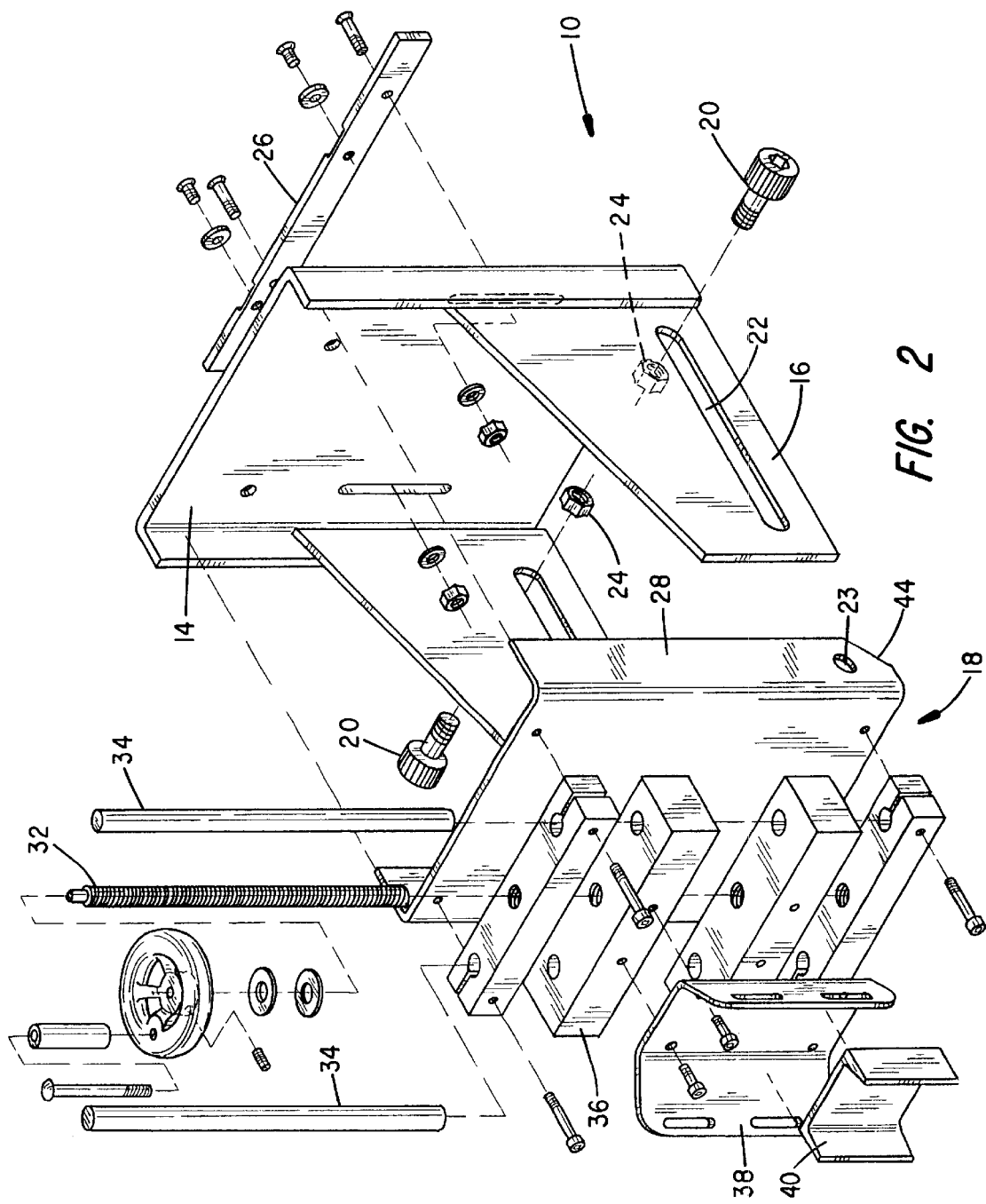
FIG. 2 is an exploded perspective view of the portable fixture of the type shown in FIG. 1 with the router removed.

Referring first to FIGS. 1 and 2, the portable fixture 10 has a base 14, extension members 16 and support frame 18. The support frame 18 is attached to the extension members 16 with adjustable rotation pins 20. The rotation pins 20 extend through slots 22 formed in the extension members 16 and through bores 23 extending through the base plate 28. The support frame 18 may be linearly displaced along the slots 22 and/or may be rotated about rotation pins 20. When the desired position and angle of the support frame 18 is attained, nuts 24 are turned and tightened onto the rotation pins 20 having threading formed thereon, thereby securing the support frame 18 to the extension members 16.

An alignment member 26 is attached to the bottom of the base 14 through slots formed in the base. The alignment member 26 may be utilized to align the base 14 of the portable fixture 10 in a desired orientation relative to a groove formed in a support table (not shown). The slots in the base allow for quick adjustment of the position of the alignment member 26 relative to the base 14 and the groove in the support table. The alignment member 26 may further be utilized in conjunction with other equipment to align the base 14 of the portable fixture 10 in a desired orientation relative to the other equipment. As discussed below in greater detail, the alignment member 26 may be removed to allow arcing movement of the base 14 across the supporting table.

The support frame 18 includes a base plate 28, drive mechanism 30 attached to the base plate 28, and mounting plate 38 attached to the drive mechanism 30. The inner, lower edge of the base plate 28 is angled, to allow for clearance as the base plate is rotated. The bore 23 in the base plate 28 and the end of slot 22 are positioned far enough from the base 14 to allow free rotation of the base plate 28, without requiring the base plate 28 to be slid upward in the slot 22. Alternatively, the slot 22 and bore 23 in the base plate may be positioned close enough to the base 14 so that the angled portion of the base plate may be pressed against the base 14. In this manner, the support frame 18 may be aligned at a predetermined angle relative to the base 14.

The drive mechanism 30 includes a spindle 32, guides 34, and blocks 36 of known suitable construction The drive mechanism 30 allows for controlled linear displacement of the mounting plate 38. The mounting plate 38 is attached to the drive mechanism 30 and is adapted for securing the handheld power tool thereto. Those skilled in the art will appreciate that other drive mechanisms of known suitable construction may be utilized to linearly displace the mounting plate 18 relative to the base plate 28. For example, without limitation, a dovetail slide, ball bearing slide, t-slot, square slide and other known linear slides may all be utilized alternately to displace the mounting plate in a controlled fashion.

Although a clamp 42 is shown securing the router 12 to the mounting plate 38, those skilled in the art will appreciate that fasteners and securing methods of known suitable construction ray be used to secure the power tool to the mounting plate 38. A modified v-block or adaptor 40 may be further utilized when securing the power tool to the mounting plate 38 to reduce rotation of the power tool against the mounting plate 38.

Figure 4:
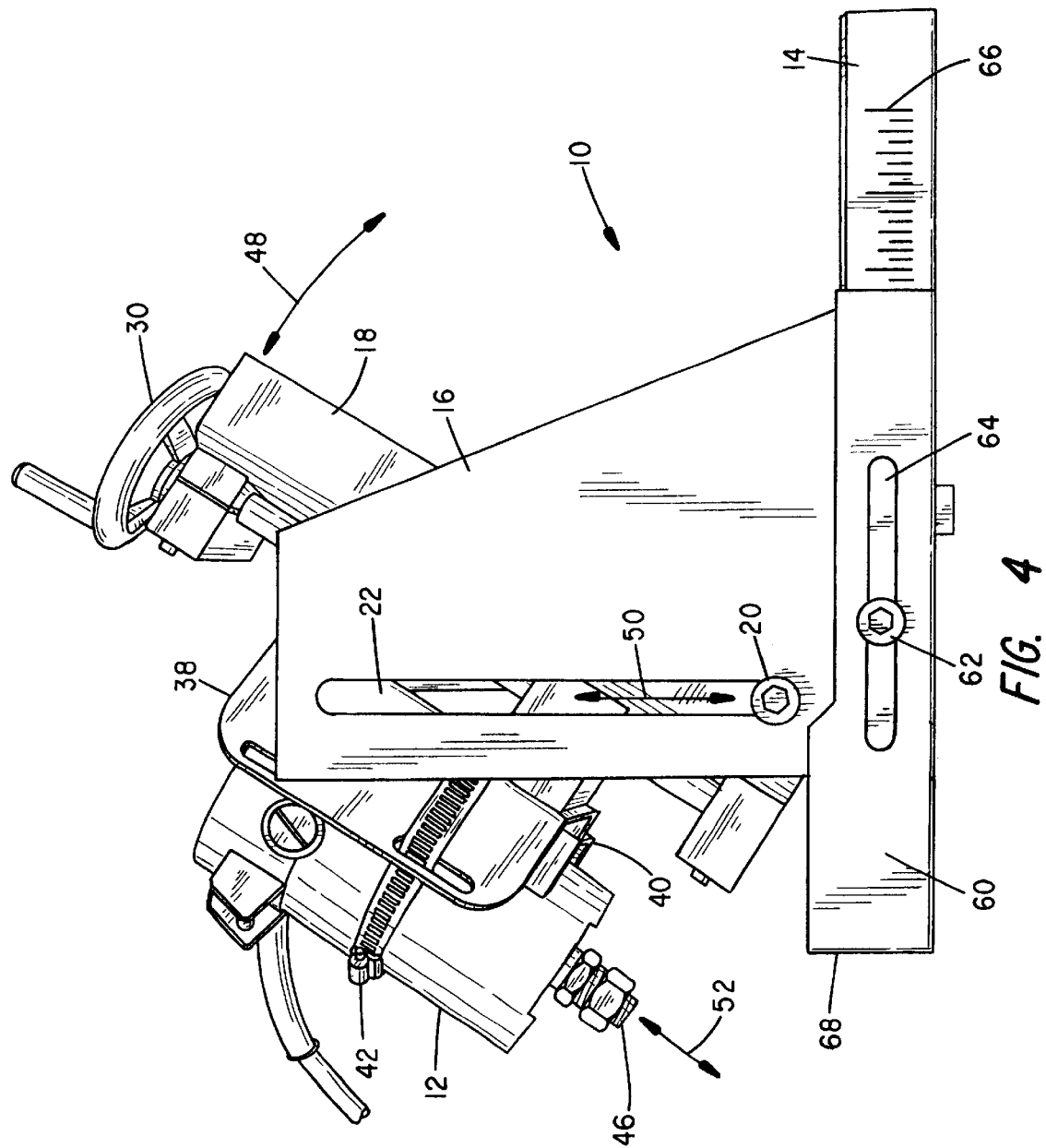
FIG. 4 is a side elevational view of an alternate embodiment of the portable fixture of the present invention.

Referring to FIG. 4, a fence 60 is shown attached to the base 14 with bolts 62. A slot is formed in the fence to allow fore and aft movement of the fence 60 relative to the base 14. The markings 66 formed on a side of the base 14, allows the user to determine precisely the position of the working edge 68 of the fence relative to the head 46 of the power tool.

Figure 5:
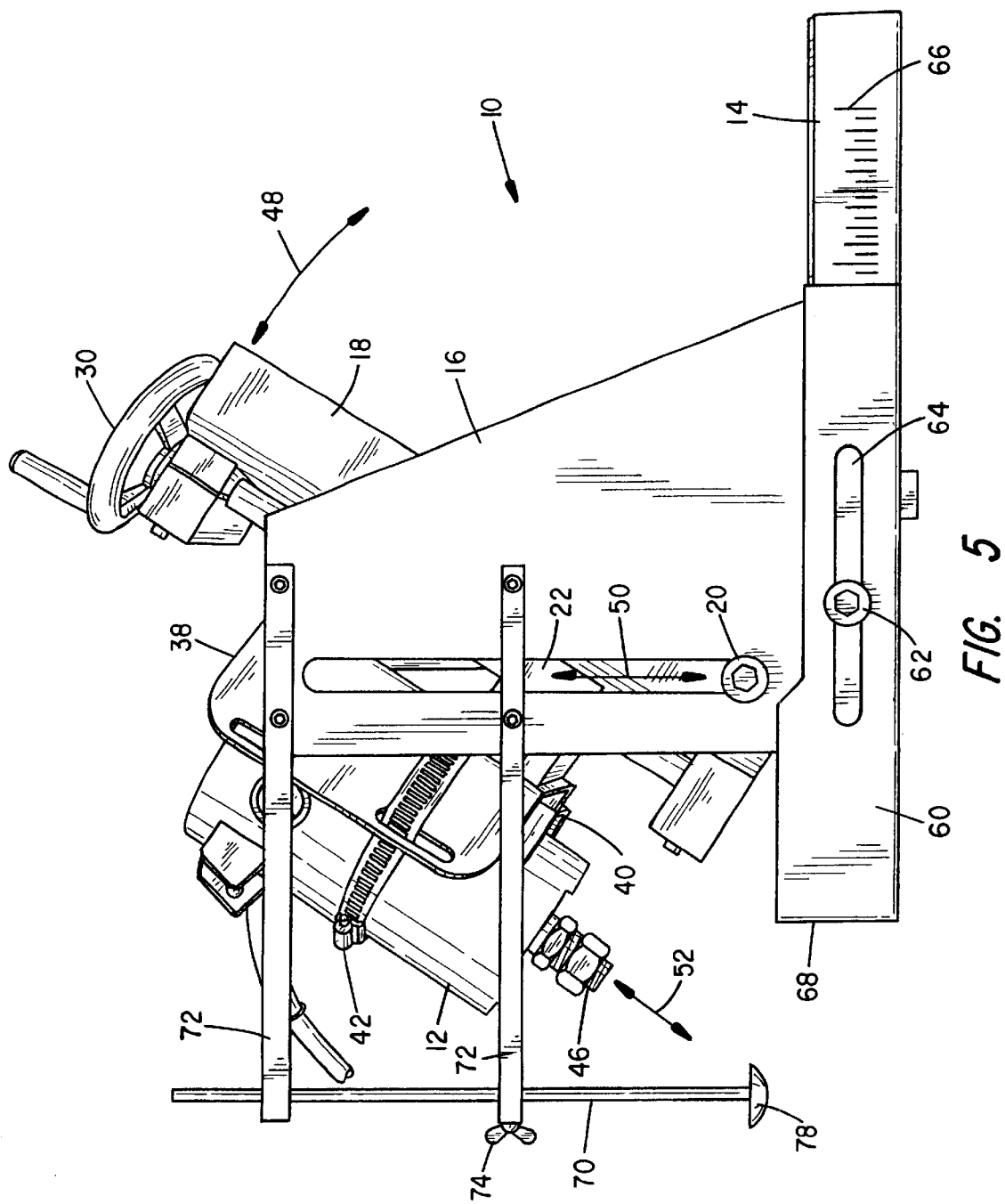
FIG. 5 is aside elevational view of an alternate embodiment of the portable fixture of present invention.
Figure 6:
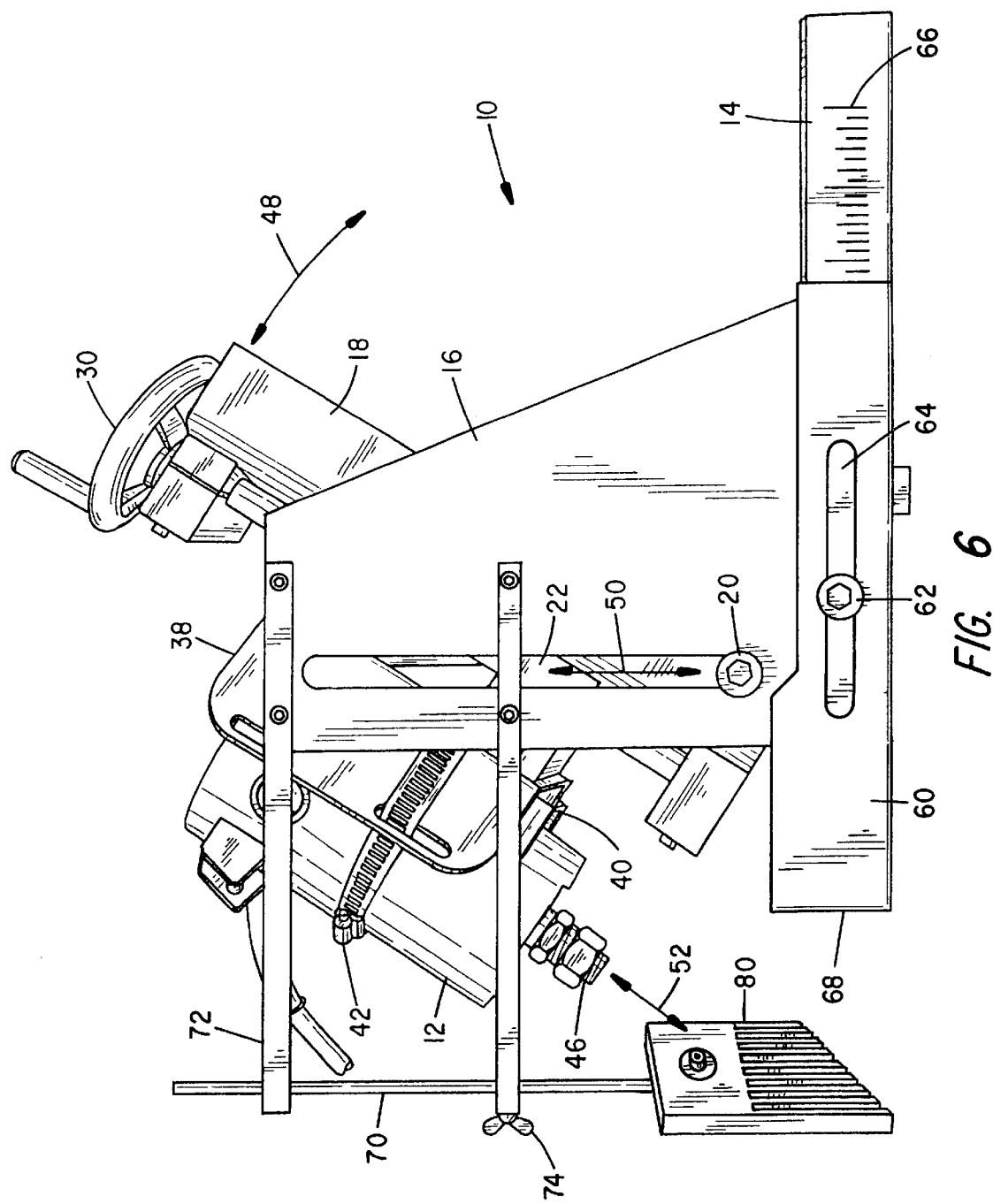
FIG. 6 is a side elevational view of an alternate embodiment of the portable fixture of the present invention.

Referring to FIGS. 5 and 6, an adjustable hold down member 70 is shown attached to the extension member 16 with brackets 72. The hold down member 70 slidingly engages brackets 72 and is held in place with fastener 74 of known suitable construction. The end of the hold down member 70 is pressed against the work piece to keep the work piece from moving upward. The end may have a partial sphere 78 (see FIG. 5) or a feather board 80 attached thereto, to allow sliding movement of the work piece under the hold down member, while restricting the upward movement of the work piece.

Figure 7:
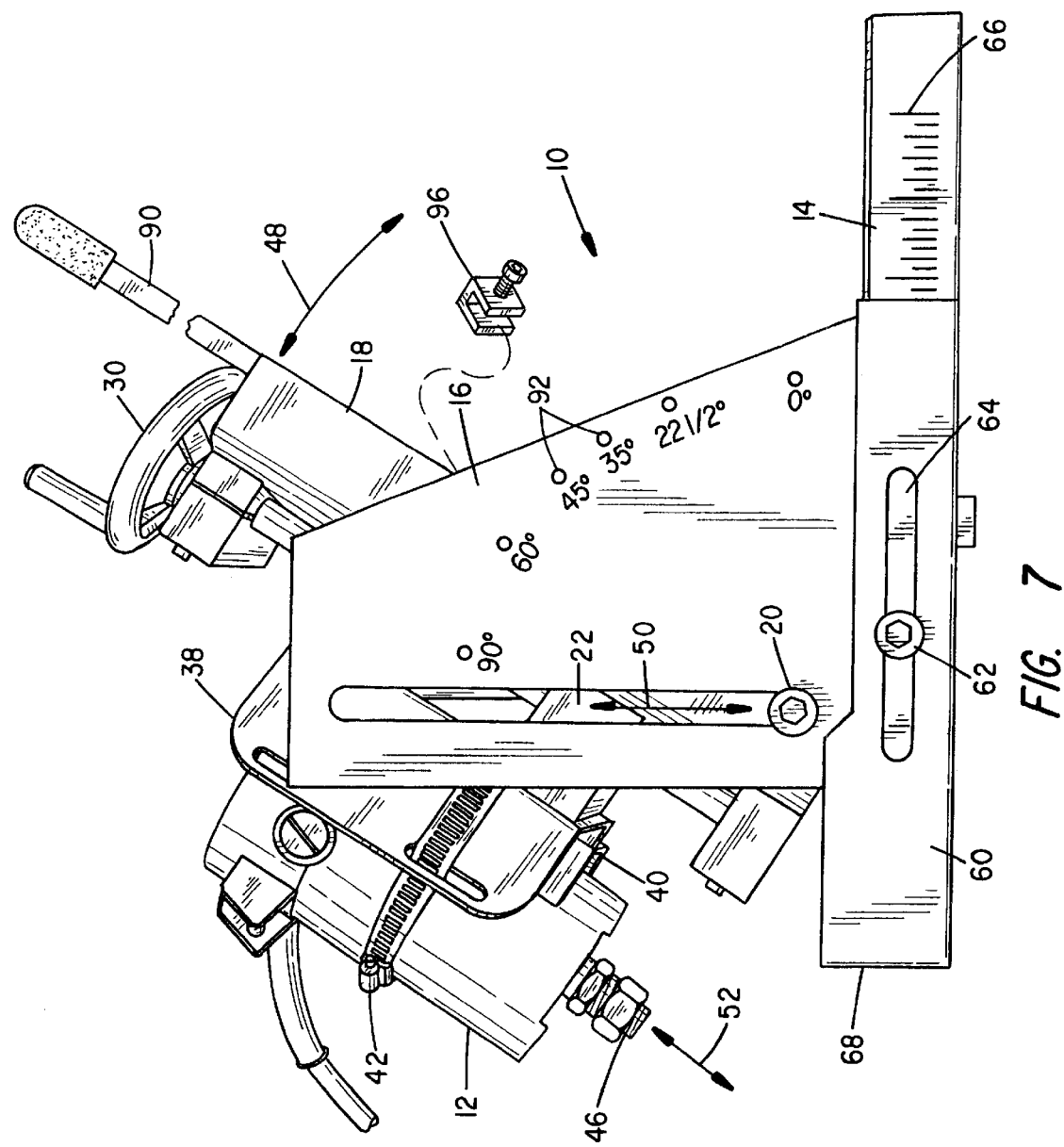
FIG. 7 is aside elevational view of an alternate embodiment of the portable fixture of the present invention.

FIG. 7 shows yet another embodiment of the portable fixture 10 of the present invention. A handle 90 extends outward from the support frame 18. The handle 90 provides a gripping surface to assist in the rotation of support frame 18 about rotation pin 20. The length of the handle 90 may be varied to increase or decrease the amount of leverage gained with the use of the handle 90. A series of bores 92 extend through the side of the extension member 16. A pin (not shown is inserted through a desired bore 92, wherein the support frame may be rotated downward to engage the bottom of the support frame against the pin. Indicia is formed on the outside of the extension member 16 proximate each bore 92 and indicates the angle at which the support member 18 has been rotated relative to the base 14. When the rotational axis of the hand held tool is aligned parallel with the bottom of the support frame, the indicia also indicates the angle at which rotational axis of the power tool has been rotated relative to the base 14. A quick connect clamp 96 of known suitable construction may be clamped on the extension member 16 and the support frame may be pressed against the quick connect clamp 96 rather than using a pin as described above. In this manner, the angle of the support frame 18 relative to the base 14 is not limited to the predefined angles determined by the position of the bores 92.

Figure 8:
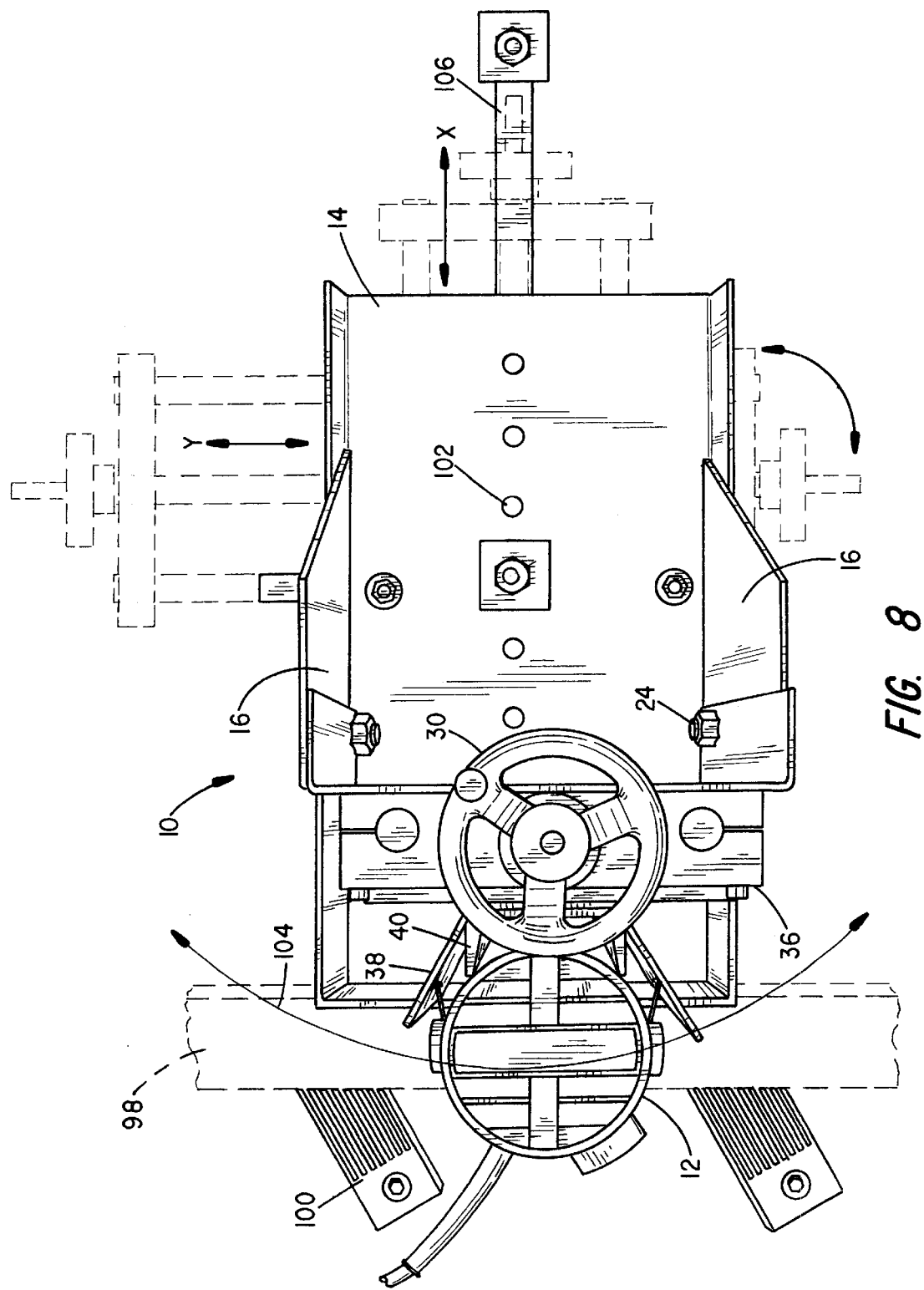
FIG. 8 is a partial perspective top plan view of an alternate embodiment of the portable fixture of the present invention, showing the rotational and linear displacement of the base.

FIG. 8 shows a work piece 98 held against the fence 60 by feather boards 100. Additional bores 102 are shown extending through the base 14. A bolt may extend through a selected bore 102 and into an aligned bore of the support table (not shown). In this manner, a pivot point is created to allow the head 46 of the power tool to sweep through arc 104. The arc 104 may be increased or decreased by changing the selected pivot point 102. Additionally, a pivot point extension arm 106 extends from the base 14 to provide an additional pivot point and to increase the arc 104.

Figure 3:
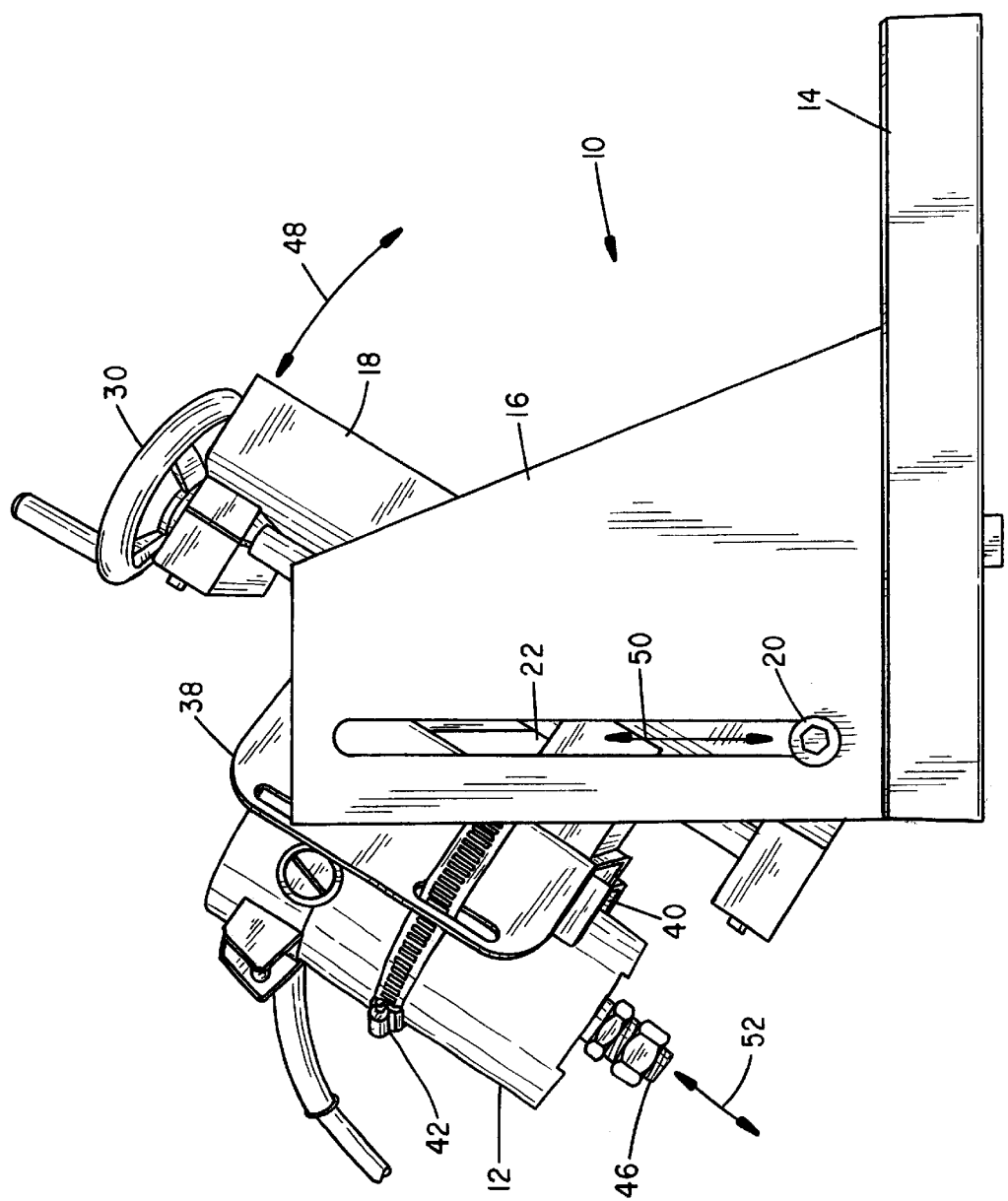
FIG. 3 is a side elevational view of the portable fixture of the type shown in FIG. 1, showing rotational and linear displacement of the support frame.

Having described the constructional features of the present invention, the mode of use will be further described in conjunction with the Figures. When the portable fixture rests on its base 14 (as shown in FIG. 3), the support frame 18 may be rotated from a horizontal to vertical and vice versa (the rotation is represented by arrow 48), thereby changing orientation of the longitudinal axis and angle of the head 46 of the power tool relative to the workpiece (not shown). The height of the head 46 may be controlled by sliding the rotation pins 20 of the support frame 18 along slots 22 (the change in height is represented by arrow 50). Linear movement of the head 46 may be controlled by drive mechanism 30 (represented by arrow 52).

Additionally, in an alternate embodiment, the portable fixture includes a rotary table attached thereto, wherein the rotary table is of known suitable construction and has drive mechanisms for linear movement of the portable fixture 10 in the x and y axis and further rotates through the x and y axis (see FIG. 4). In this manner, the woodworking tool mounted to the portable fixture 10 may be displaced with controlled multidirectional operations on a workpiece. Without limitation, the head of the woodworking tool may be tipped, rotated, and linearly displaced through multiple planes.

When attaching the hand held power tool to the mounting plate 38, the rotational axis of the power tool (if applicable) is preferably aligned parallel with the bottom of the support frame 18 when the bottom of the support frame 18 engages the base 14. To align the rotation axis parallel, a long bit may be inserted into the head of the power tool and tightened. The bottom of the support member 18 should rest on the base 14 prior to inserting the long bit in the power tool. If the rotational axis is parallel with the support member, then the perpendicular distance from the table to a lower end edge of the bit should be the same as the perpendicular distance from the table to a lower edge of the bit adjacent the head of the power tool. If the distances are not the same, the position of the power tool in the mounting plate 38 should be changed until the distances are equal. Once the user has properly aligned the rotation axis of the power tool, the degree the head 46 of the power tool and the rotational axis of the power tool is rotated away from the base 14 is easily determined.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A fixture for hand held woodworking power tools that allows for multi-directional operations on a workpiece, said fixture comprising:
   a base;
   an extension member extending outwardly from the base;
   a support frame that supports a hand held power tool, said support frame slidably attached to said extension member, wherein said support frame includes a drive system that controls linear displacement of said support frame.

2. The fixture according to claim 1, wherein said support frame may be rotated about an axis of the extension member.

3. The fixture according to claim 1, said extension member including a slot extending therethrough, wherein said support frame may be linearly displaced along the slot.

4. The fixture according to claim 2, said extension member including a slot extending therethrough, wherein said support frame may be linearly displaced along the slot.

5. The fixture according to claim 1, wherein said base has a top and bottom surface, said extension member extending from the top surface and an alignment member extending from the bottom surface of said base.

6. The fixture according to claim 1, further including a second drive system attached to said base that controls linear displacement of said base in an x axis.

7. The fixture according to claim 6, further including a third drive system attached to said base that controls linear displacement of said base in a y axis.

8. The fixture according to claim 1, further including a rotational drive system attached to said base that controls rotational displacement of said base.

9. The fixture according to claim 2, further including a rotational drive system attached to said base that controls rotational displacement of said base.

10. The fixed according to claim 3, further including a rotational drive system attached to said base that controls rotational displacement of said base.

11. The fixture according to claim 6, further including a rotational drive system attached to said base that controls rotational displacement of said base.

12. The fixture according to claim 7, further including a rotational drive system attached to said base that controls rotational displacement of said base.

13. The fixture according to claim 1, further including a handle extending outwardly from the support frame.

14. The fixture according to claim 1, further including a hold down member extending from the portable fixture.

15. The fixture according to claim 1, further including an adjustable fence attached to said fixture.

16. The fixture according to claim 1, further including means for adjusting the support frame angle at a fixed angle relative to the base.

17. The fixture according to claim 1, further including means for pivoting the fixture about an axis.

18. A fixture for hand held woodworking power tools that allows for multi-directional operations on a workpiece, said fixture comprising:
   a base;
   an extension member extending outwardly from the base;
   a support frame that supports a hand held power tool, said support frame slidably attached to said extension member, wherein said support frame includes a displacement means for displacing said support frame a controlled amount in a linear direction.

19. The fixture according to claim 18, wherein said support frame may be rotated about an axis of the extension member.

20. The fixture according to claim 18, said extension member including a slot extending therethrough, wherein said support frame may be linearly displaced along the slot.

21. The fixture according to claim 19, said extension member including a slot extending therethrough, wherein said support frame may be linearly displaced along the slot.

22. The fixture according to claim 18, wherein said base has a top and bottom surface, said extension member extending from the top surface and an alignment member extending from the bottom surface of said base.

23. The fixture according to claim 18, further including a drive system attached to said base that controls linear displacement of said base in an x axis.

24. The fixture according to claim 19, further including a second drive system attached to said base that controls linear displacement of said base in a y axis.

25. The fixture according to claim 18, further including a rotational drive system attached to said base that controls rotational displacement of said base.

26. The fixture according to claim 19, further including a rotational drive system attached to said base that controls rotational displacement of said base.

27. The fixture according to claim 20, further including a rotational drive system attached to said base that controls rotational displacement of said base.

28. The fixture according to claim 18, further including a handle extending outwardly from the support frame.

29. The fixture according to claim 18, further including a hold down member extending from the portable fixture.

30. The fixture according to claim 18, further including an adjustable fence attached to said fixture.

31. The fixture according to claim 18, further including means for adjusting the support frame angle at a fixed angle relative to the base.

32. The fixture according to claim 18, further including means for pivoting the fixture about an axis.

* * * * *